(12) United States Patent  (10) Patent No.: US 7,991,252 B2
Cheng et al.  (45) Date of Patent: Aug. 2, 2011

(54) BLIND-MATE OPTICAL CONNECTOR FOR SERVER REMOTE MEMORY APPLICATION

(75) Inventors: Hengju Cheng, Mountain View, CA (US); Jamyuen Ko, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 367 days.

(21) Appl. No.: 12/165,611

(22) Filed: Jun. 30, 2008

(65) Prior Publication Data

US 2009/0324176 A1 Dec. 31, 2009

(51) Int. Cl.
G02B 6/26 (2006.01)
G02B 6/42 (2006.01)
(52) U.S. Cl. .................. 385/25; 385/50; 385/56
(58) Field of Classification Search .......... 385/25, 385/50, 56
See application file for complete search history.

(56) References Cited

U.S. PATENT DOCUMENTS

| | | | | |
|---|---|---|---|---|
| 4,951,521 A | * | 8/1990 | Jacobson | 74/490.06 |
| 4,954,094 A | * | 9/1990 | Humphrey | 439/247 |
| 6,577,793 B2 | * | 6/2003 | Vaganov | 385/52 |
| 6,859,581 B1 | * | 2/2005 | Smith et al. | 385/26 |
| 7,217,040 B2 | * | 5/2007 | Crews et al. | 385/62 |
| 2009/0110347 A1 | * | 4/2009 | Jacobsson | 385/16 |

* cited by examiner

*Primary Examiner* — Uyen-Chau N Le
*Assistant Examiner* — John M Bedtelyon
(74) *Attorney, Agent, or Firm* — Kevin A. Reif

(57) ABSTRACT

Blind-made optical connectors may not be robust and tend to be very sensitive to dust. Accordingly, a floating barrel blind mate optical connector is described which floats with many degrees of freedom for easy connections and accommodates expanded beam connectors to alleviate many common drawbacks.

19 Claims, 3 Drawing Sheets

BLIND-MATE OPTICAL CONNECTOR FOR SERVER REMOTE MEMORY APPLICATION

FIELD OF THE INVENTION

The present invention relates to fiber optic communication and, more particularly, to coupling radiant energy.

BACKGROUND INFORMATION

In many modern applications, optical input/output (IO) is being used in computer systems to transmit data between system components. Optical I/O is able to attain higher system bandwidth with lower electromagnetic interference than conventional I/O methods.

U.S. Pat. No. 7,217,040 to Crews et al., commonly assigned with the present invention, discloses a blind mate optical connector including a floating component to receive a first set of optical waveguides, and a fixed component to receive a second set of optical waveguides and to facilitate optical alignment between the first set of waveguides and the second set of waveguides through automated alignments with the floating component.

Referring to FIG. 1 there is shown a block diagram of one embodiment of a computer system 100 which may benefit from such a connector. Computer system 100 is a blade server that includes a chassis 110 and blades 120. In one embodiment, blades 120 are "hot-swappable" devices that are coupled to a backplane of chassis 110. Each blade may be an independent server having one or more processors, an associated memory, disk storage and network controllers. Optical fibers are coupled to each of the one or more blades 120 at the backplane to facilitate optical I/O.

Blind-made optical connectors have existed for some time such as the so called multi-fiber push-on (MPO) connector. An drawback of using an MPO connector in the backplane application may be that the connector interface is very sensitive to dust. The interface relies on a butt-to-butt contact of two MT ferrules on each side to maintain optical communication.

If there is a 50 um diameter dust clogged between two MT ferrules, optical coupling loss can go up dramatically. Since dust is inevitable in general operation environment, this issue has prevented the wide adoption of MPO connectors.

Second, high precision MT ferrule with better than 5 um tolerance at the alignment pin/hole is required to achieve excellent optical coupling. Third, the physical contact between the alignment pin and hole might wear out and it will increase the optical coupling loss significantly. Additionally there is a complex latch mechanism. Because of the high selling cost and expensive maintenance of using this type of connector, the MPO connectors are only used in some very high-end routers where the connector density is the most important consideration.

BRIEF DESCRIPTION OF THE DRAWINGS

The foregoing and a better understanding of the present invention may become apparent from the following detailed description of arrangements and example embodiments and the claims when read in connection with the accompanying drawings, all forming a part of the disclosure of this invention. While the foregoing and following written and illustrated disclosure focuses on disclosing arrangements and example embodiments of the invention, it should be clearly understood that the same is by way of illustration and example only and the invention is not limited thereto.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In order to increase the robustness of blind-mate optical connector, a scheme called "expanded beam" has been developed for military application such as the expanded beam optical connector.

Figure 1:
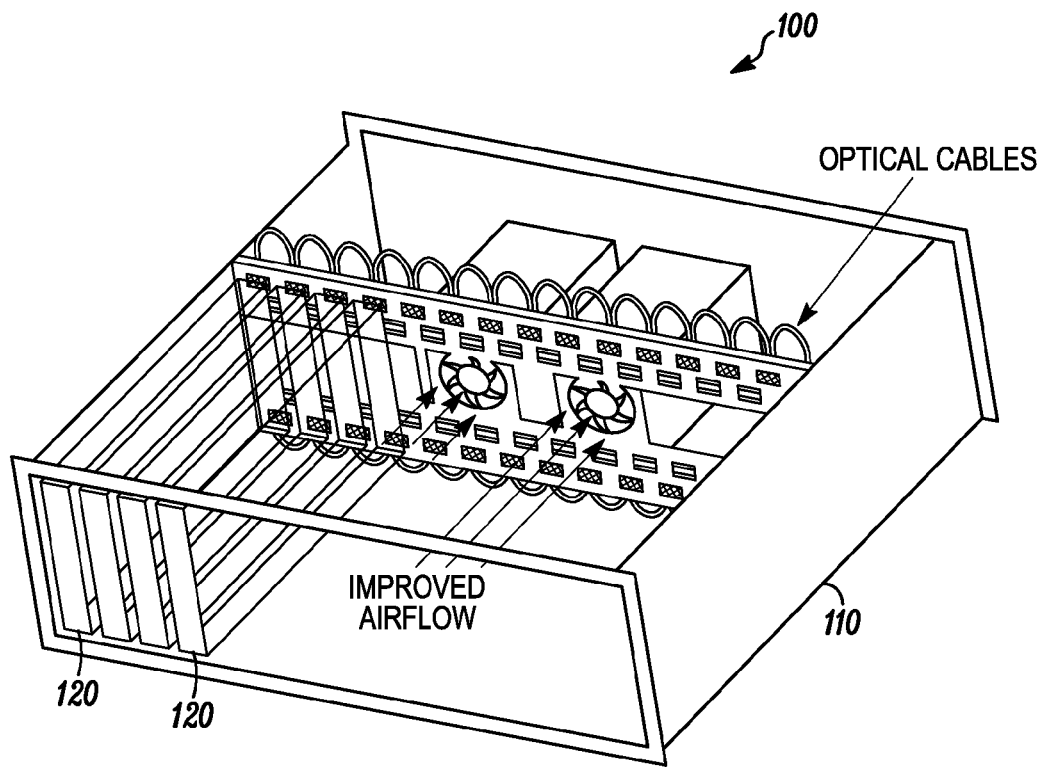
FIG. 1 illustrates one environment in which embodiments of the invention may find application.
Figure 2:
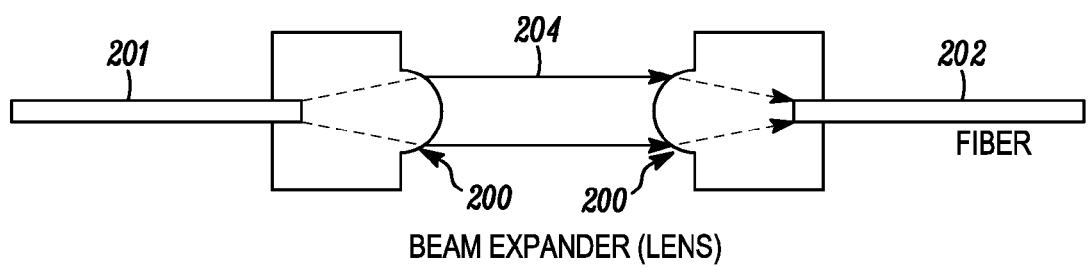
FIG. 2 is a diagram of an expanded beam connector.

As shown in FIG. 2, this type of connector uses two convex lenses 200 to expand the beam size at the end of fiber to mating fibers 201 and 202 from about 50 um to about 1000 um. As shown in FIG. 2, the beam 204 is expanded by the lens 200 on the left side and travels through the free space between two lenses 200. When it reaches the lens on the right side, the beam is focused back into the fiber 202. Since the beam size is large and there is no physical contact between two lenses 200, as long as the lens surface is not 100% covered by contamination, some light can always get through. In addition, due to large lens surface, the requirement of tight mechanical tolerance at the alignment can be greatly reduced (around 300 um compared to 15 um).

Although this approach increases the robustness of the connector, it does have a drawback of higher coupling loss (about 1 dB) as compared with that of MPO (about 0.5 dB). This is due to the reflection from the plastic/air interface. Fortunately, this drawback may be alleviated if anti-reflection coating is used on lens surface.

The expanded beam technology as shown in FIG. 2 may resolve the dust issue in general operation environment but does not solve the alignment issue of the server blade with respect to the backplane. This is because the mechanical tolerance at the server blade is huge. Embodiments of the present invention disclose a floating barrel mechanism to resolve this issue.

Figure 3:
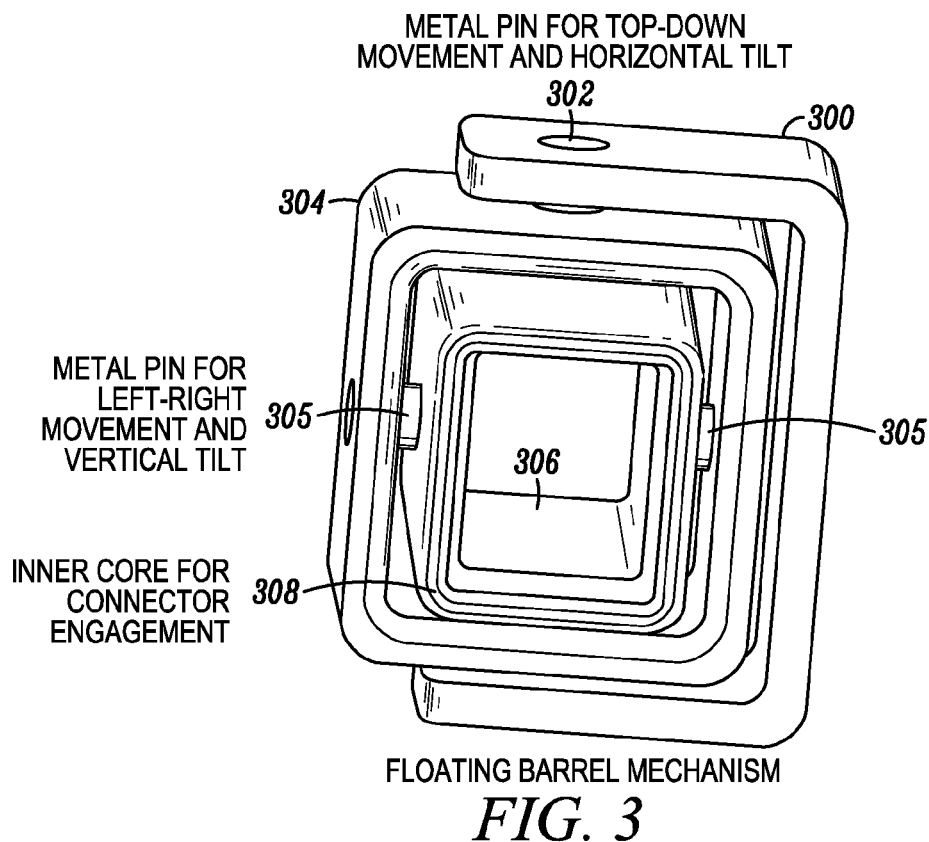
FIG. 3 is one embodiment of a floating barrel connector according to the invention.

Referring now to FIG. 3, there is illustrated a floating barrel mechanism according to one embodiment of the invention. An outer bracket 300 which is shown as being generally "U" shaped (shown lying in its side) may have a metal pin 302 on one side as well as corresponding pin (not shown) on an opposing side of the bracket. These pins 302 are oriented along the y-axis, if describing the invention in a Cartesian coordinate system.

Two "floating" barrels may be concentrically located within the outer bracket 300. The first floating barrel 304 is positioned within the bracket 300 and is attached by the pins 302 such that it may rotate about the y-axis hinged by pins 302 or may slide up and down traversing the pins 302. The first floating barrel 304 also has two pins 305 positioned parallel with an x-axis.

The second floating barrel 306 is smaller than the first barrel 304 and is attached to the first barrel 304 by the pins 305 such that it may rotate about the x-axis hinged by the pins 305 or float back and forth along the pins 305.

Thus, if the outer bracket 300 is stationary, the first barrel 304 provides top-down movement and well as horizontal tilt. Similarly, the inner barrel 306 provides left right movement as well as vertical tilt. The inner core 308 of the inner barrel 306 is open from one end through to the other and provides a place for optical connector engagement.

Figure 4:
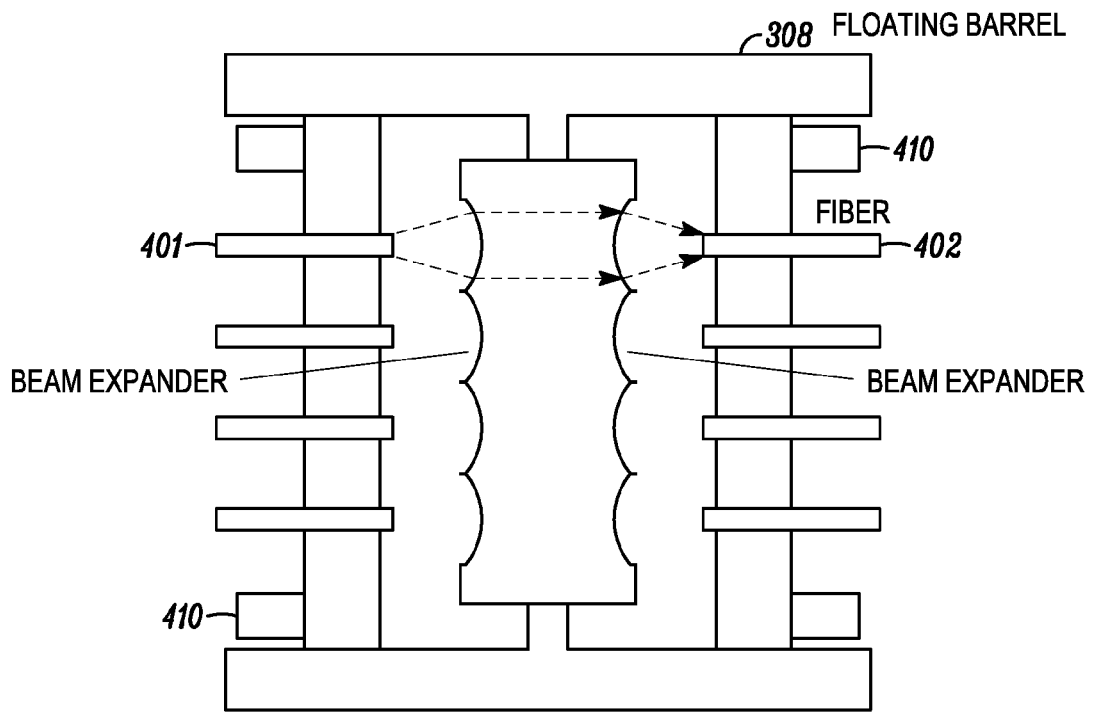
FIG. 4 is a block diagram illustrating the floating barrel connector used with multiple beam expander connectors.

Referring now to FIG. 4, since the barrel at the backplane connector can float it can accommodate all mechanical tolerance incurred on the backplane and the server blade. FIG. 4 illustrates the basic idea of floating barrel. The center core 308 is designed to hold both mating sides of a multi-expanding beam connector comprising multiple beam expanders 400 connecting fibers 401 and 402 on either side of the core 308. To achieve the floating mechanism, metal pins are installed in appropriate location to allow respective core to tilt and slide as discussed above. Optionally, springs 410 may be used to bias components in place.

Figure 5:
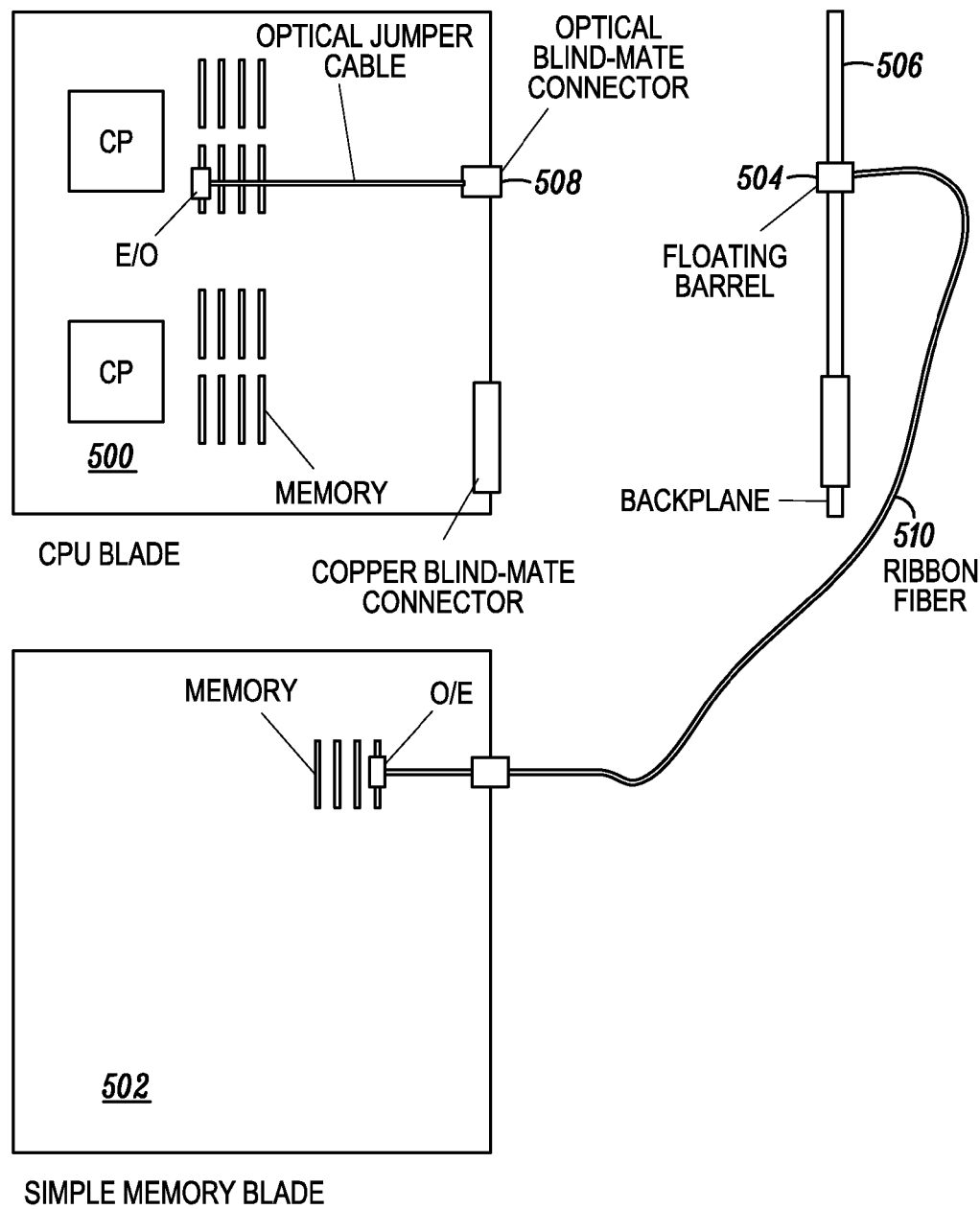
FIG. 5 is a diagram of using the "expanded beam" and "floating barrel" methods to realize an optical remote memory system.

FIG. 5 show an application for embodiments of the present invention comprising a CPU blade 500 and a simple memory blade 502. The floating barrel according to the invention 504 on the backplane 506 may easily mate with the optical blind mate connector 508 to connect the CPU blade 500 to the memory blade 502 with, for example, a ribbon fiber 510. Thus, with the above "expanded beam" and "floating barrel" methods, the optical remote memory system can be realized. This may provide may advantages such as immunity from the dust issue in general operation environment, lower manufacturing cost. Further, huge electrical connectors may be replaced by small high-density optical connector to ease air flow and solve thermal issues.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
   a generally U-shaped bracket having a first set of pins on its opposing sides;
   a first barrel to fit within the U-shaped bracket connected to pivot within the bracket with the first set of pins, the first barrel comprising a second set of pins;
   a second barrel to fit within the first barrel and connected to pivot about the second set of pins;
   a core through the second barrel to accommodate a pair of optical connectors with one optical connector on either side of the core, the optical connectors in the core facing each other and being stationary relative to each other.

2. The apparatus as recited in claim 1, wherein the connectors comprise at least one expanded beam connector.

3. The apparatus as recited in claim 1 wherein the connectors comprise a plurality of expanded beam connectors.

4. The apparatus as recited in claim 3 further comprising springs to hold the connectors in place.

5. The apparatus as recited in claim 1 wherein the first barrel moves up and down along the first set of pins and tilts in a horizontal direction about the first set of pins.

6. The apparatus as recited in claim 5 wherein the second barrel moves side to side along the second set of pins and tilts in a vertical direction about the second set of pins.

7. A method, comprising:
   providing a generally U-shaped bracket having a first set of pins on opposing sides;
   placing a first barrel to fit within the U-shaped bracket connected to pivot within the bracket with the first set of pins, the first barrel comprising a second set of pins;
   placing a second barrel to fit within the first barrel and connected to pivot about the second set of pins; and
   mechanically aligning a pair of optical connectors within a core of the second barrel, the optical connectors in the core facing each other and being stationary relative to each other.

8. The method as recited in claim 7, wherein the connectors comprise at least one expanded beam connector.

9. The method as recited in claim 7 wherein the connectors comprise a plurality of expanded beam connectors.

10. The method as recited in claim 9 further comprising springs to hold the connectors in place.

11. The method as recited in claim 7, further comprising:
    moving the first barrel up and down along the first set of pins and tilting the first barrel in a horizontal direction about the first set of pins.

12. The method as recited in claim 11, further comprising:
    moving the second barrel side to side along the second set of pins and tilting the second barrel in a vertical direction about the second set of pins.

13. A floating barrel optical connector, comprising:
    a generally U-shaped bracket having a first set of pins on opposing sides;
    a first barrel to fit within the U-shaped bracket connected to pivot within the bracket with the first set of pins, the first barrel comprising a second set of pins;
    a second barrel to fit within the first barrel and connected to pivot about the second set of pins;
    a core through the second barrel to accommodate a pair of optical connectors, the optical connectors in the core facing each other and being stationary relative to each other; and
    fibers to optically connect to the optical connectors.

14. The floating barrel optical connector as recited in claim 13, wherein the connectors comprise at least one expanded beam connector.

15. The floating barrel optical connector as recited in claim 13 wherein the connectors comprise a plurality of expanded beam connectors.

16. The floating barrel optical connector as recited in claim 15 wherein the second barrel moves side to side along the second set of pins and tilts in a vertical direction about the second set of pins.

17. The floating barrel optical connector as recited in claim 13 wherein the first barrel moves up and down along the first set of pins and tilts in a horizontal direction about the first set of pins.

18. The floating barrel optical connector as recited in claim 13 further comprising springs to hold the connectors in place.

19. The floating barrel optical connector as recited in claim 13, wherein the optical connector attaches to a backplane of a blade.

* * * * *